US005585871A

United States Patent [19]
Linden

[11] Patent Number: 5,585,871
[45] Date of Patent: Dec. 17, 1996

[54] MULTI-FUNCTION DISPLAY APPARATUS

[76] Inventor: Harry Linden, 146 S. Sierre Vista Rd., Santa Barbara, Calif. 93108

[21] Appl. No.: 452,008

[22] Filed: May 26, 1995

[51] Int. Cl.$^6$ ................................................. G02C 1/00
[52] U.S. Cl. .................................................... 351/158
[58] Field of Search ....................... 351/158, 43; 368/10, 368/276, 277, 278, 279; 345/7, 8

[56] References Cited

U.S. PATENT DOCUMENTS

| 4,526,473 | 7/1985 | Zahn, III | 368/10 |
|---|---|---|---|
| 4,751,691 | 6/1988 | Perera | 368/10 |
| 4,776,045 | 10/1988 | Mysliwiec | 2/426 |
| 4,796,987 | 1/1989 | Linden | 351/158 |
| 4,869,575 | 9/1989 | Kubik | 345/8 |
| 5,029,963 | 7/1991 | Naselli | 350/96.18 |
| 5,103,713 | 4/1992 | Loving | 89/1.816 |
| 5,258,785 | 11/1993 | Dawkins, Jr. | 351/43 |
| 5,266,977 | 11/1993 | Linden | 351/47 |

FOREIGN PATENT DOCUMENTS

| 0562742 | 11/1993 | European Pat. Off. | 345/7 |
|---|---|---|---|
| 627410 | 2/1994 | Japan | 345/8 |

*Primary Examiner*—William L. Sikes
*Assistant Examiner*—James A. Dude
*Attorney, Agent, or Firm*—Gene Scott

[57] ABSTRACT

A display apparatus secured to a temple or bridge contacting portion of an eyewear, the apparatus including means for monitoring the wearer's heart rate, lap position, laps completed, time elapsed, etc. An image of the collected data is transmitted into the wearer's field of view by means of a fiber optic element and projected at a focal point within the focusing range of the wearer's eyes.

16 Claims, 4 Drawing Sheets

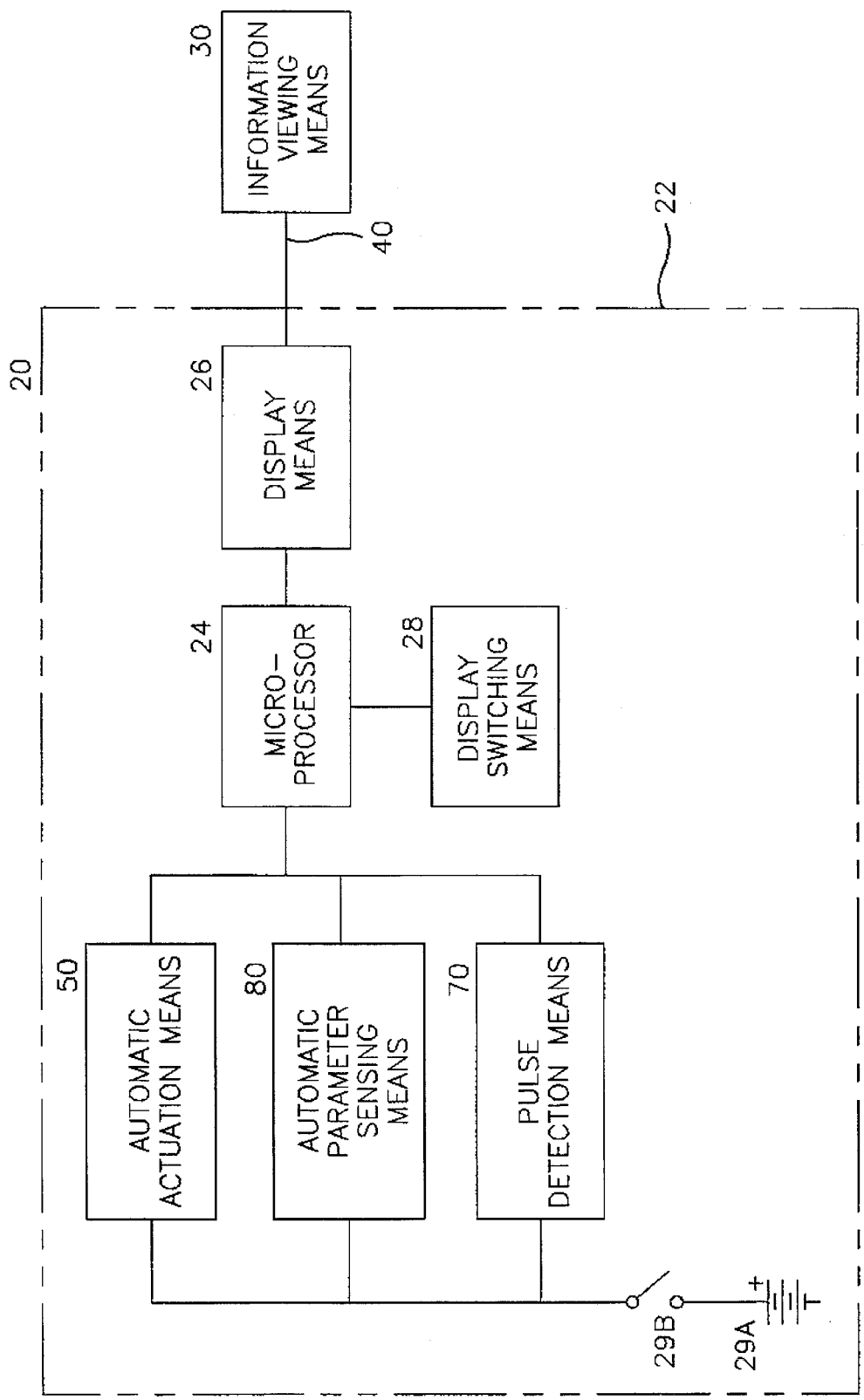

MULTI-FUNCTION DISPLAY APPARATUS

BACKGROUND OF THE INVENTION

1. Field of the Invention

This invention relates generally to information displays and more particularly to a sports related protective eyewear mounted display for monitoring a variety of performance-related information and for displaying it at a focal distance that is comfortable to the viewer.

2. Description of Related Art

Invention and use of eyewear mounted display apparatus are known to the public. For example, Zahn U.S. Pat. No. 4,526,473 discloses a sports timer with an electronic display that is mounted to eyewear so that it can be easily viewed by the wearer while active, yet not in that portion of the field of view as to be visually intrusive. This invention utilizes a controller mounted to one side, and information is transmitted to the display by electric wires.

Pererz U.S. Pat. No. 4,751,691 teaches a goggle mounted display means primarily unique in the top position mounting and the optical components arrangement. It provides for moving the display out of the forward field of view by placing it above the goggle. This device is fragile in that the mirror assembly is not structurally strong enough to be used in diving by competitive swimmers for example.

Mysilwiec et al U.S. Pat. No. 4,776,045 provides for another goggle mounted display device, and is expressly designed for use in competitive swimming. The device is modular, completely mounted on one of the swimmers goggle lenses, and provides for automatic start-up upon diving impact with the water.

Linden U.S. Pat. No. 4,796,987 discloses a digital display designed to be mounted to head protection gear, such as goggles, during a sporting activity. When used in conjunction with Linden's U.S. Pat. No. 5,266,977, the timing device is designed to be mounted with a suction cup directly in the wearer's field of view. An inclusive lens presents the image so as to be focused at a minimum of 10 inches in front of the wearer.

Dawkins, Jr. U.S. Pat. No. 5,258,785 discloses a combination of a transparent eye shield, a display means and a lens mounted to eyewear, such as goggles, adjacent to an athlete's eye for convenient viewing and controlling of a data display device. The display portion is intrusive on the field of view to some extent.

In summary then, Mysilwiec et al, Pererz, Linden and Dawkins all provide for a fully integrated display device mounted to the lens of an eyewear. Although many electronic and optical components are highly miniaturized, the device is still limited in size and weight so as not to be too heavy, bulky or intrusive with respect to the wearer's field of view. Zahn, III improves on the above by providing a highly miniaturized optical display device mounted to the goggle lens, but placing the electronic module that supports the display, at one side of the head supported by the goggle strap. Thus a larger calculation and storage of data can be accomplished by Zahn, III's device, while successfully placing the display out of the forward field of view.

U.S. Pat. No. 5,103,713 issued to Loving in 1992 discloses an imaging sight that uses a fiber optic bundle to transfer an image from a point of capture to an off-angle viewer's location, while U.S. Pat. No. 5,029,963 issued to Naselli in 1991 discloses an image intensifier that uses a fiber optic cable for transferring an image into a viewer's line of sight. In both of these inventions, fiber optics are used to transfer an image from one location into a viewer's line of sight. However, both of these devices are designed only to transfer and intensify an image to a more opportune location, and are not equipped to monitor a variety of different information, such as user's heart rate, blood-pressure, distance traveled, etc.

Thus, there is a clear need for an improved eyewear mounted display apparatus that monitors pertinent information related to activity performed by the wearer. Such an invention would not be positioned directly in the wearer's forward line of sight, but rather would utilize a fiber optic element to relay and project the information into the focal range of the wearer. Such a device would, as well, overcome the other drawbacks of prior art devices as described above.

The present invention fulfills these needs and provides further related advantages as described in the following summary.

SUMMARY OF THE INVENTION

The present invention is an improved display apparatus that monitors and allows visual access to a variety of information when the device is attached to or built into head mounted fixtures, such as goggles, glasses, shields or visors. The product is especially beneficial for providing information to athletes, such as swimmers, runners and cyclists, who have previously not been able to closely monitor their heart rate, time elapsed or laps completed during performance without disrupting the activity. Thus it is a primary object of the present invention to provide a miniature digital display primarily designed to be used by athletes to hands-off monitor various components of their performance.

Unlike prior art devices, the present invention does not require that the entire apparatus be mounted in the wearer's field of view. Instead, the bulk of the components, which comprise an information control means, are stored within a small housing unit that can be attached to the eyewear at any desired location around the head area. Since the housing is positioned at a remote location and does not inhibit the wearer's vision, it can be constructed with a size greater than would be normally possible, thus providing several advantages not otherwise attainable. First of all, the increased size allows a larger, replaceable power source to be implemented, such a power source being more easily replaced and providing more capacity than in those prior art devices requiring extreme miniaturization in the battery cell. The larger power source also provides for a more powerful apparatus that can effectively monitor and display a wide range of pertinent information, such as heart rate, time elapsed, lap count, etc., whereas prior art devices are generally limited to monitoring fewer functions and for a shorter time due to early power exhaustion.

A heart rate monitor is easily incorporated into the present invention, the monitor provided within the housing unit of the device. When the heart rate monitor is included in the present invention, the housing unit need be simply mounted to the eyewear in such a way as to contact the wearer's temple or the bridge of the nose. Thus, it is an object of the invention to continually provide the wearer with updated heart rate information during the course of an activity. An activity parameter sensing means is also preferably included in the invention so as to keep track of, for instance, the number of laps completed, or other available and desired information. The parameter sensing means can work on several principles, for example either by means of a motion sensitive switch, a magnetic proximity sensor, capacitance discharge sensor or light beam sensor.

Depending on the intended use of the display apparatus, additional components may be included for monitoring other pertinent information, such as blood pressure, distance traveled, etc. The inclusion of a variety of components for monitoring several different aspects of performance is a significant inventive feature of the present invention, as the information is automatically, continually updated and displayed without necessitating that the wearer pause in his activity. Preferably, buttons are positioned on the housing unit so that the wearer can select which aspects of performance are monitored and displayed during a given activity.

An information display means contained within the housing unit generates an image of the collected performance-related data. The image is transmitted from the display means to an information viewing means in the user's field of vision via a fiber optic element. The information viewing means, which is secured to the lens of the eyewear, engages the fiber optic elements so that the image is projected through an optical lens means which enlarges the image and projects it within the focusing range of the wearer's eye. The fiber optic elements and the information viewing means may be constructed with a diameter as small as 0.3 mm. Thus, it is an object of the invention to provide a range of pertinent information to the wearer in such a way that the image is clearly visible without obstructing a working portion of the wearer's field of view.

The present invention also includes an inventive automatic starting feature so that the apparatus automatically begins gathering and displaying data upon beginning the activity. The automatic starting feature may be activated by a flashed infra red signal attached to a starters gun, bell or buzzer, or it may utilize an impact sensitive switch. Thus it is an object of the invention to provide an automatic starting feature which caters to the needs of athletes in competition.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention, a multi-function display apparatus. In such drawings:

FIG. 5 is a schematic block diagram of the invention.

DETAILED DESCRIPTION OF THE PREFERRED EMBODIMENT

FIGS. 1–5 show a multi-function display apparatus that is either formed integrally with or attached to protective eyewear 10, such as goggles, glasses, shields or visors, that have a temple 13 or bridge 11 contacting portions and at least one lens portion 14. The display apparatus is particularly suited for use during athletic activities, such as swimming, biking or running. It is designed to project a variety of pertinent information, such as time elapsed, heart rate, blood pressure, laps completed, etc., to a point in space where it is clearly visible to the wearer of the eyewear 10, yet the display is not intrusive on the wearer's field of view.

Figure 1:
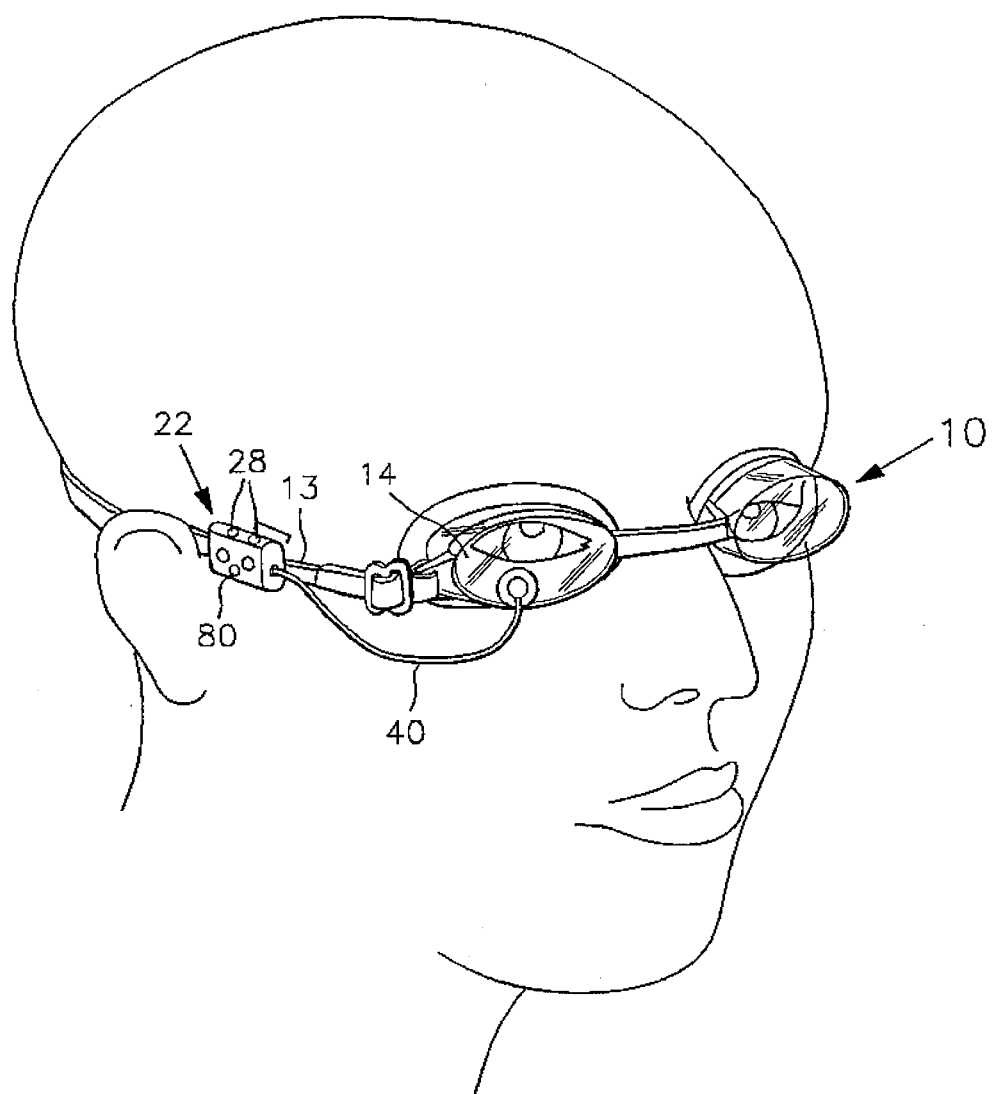
FIG. 1 is a perspective view of the preferred embodiment of the present invention, particularly showing the placement of the components of the invention in which one possible placements of the housing 22 is shown.
Figure 2:
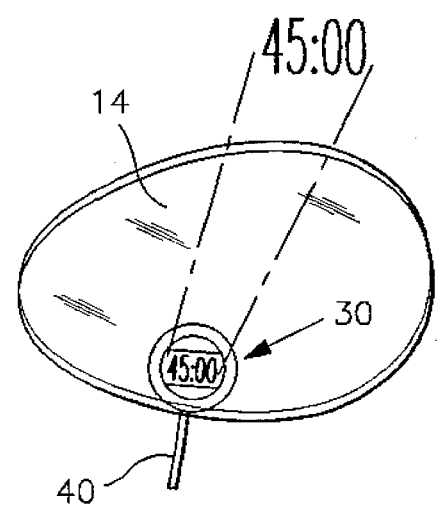
FIG. 2 is a close-up view of the goggle lens showing the display device as seen by the wearer and depicting a typical real image as might be projected onto the rear side of The wearer may choose to position the along a normal line of sight 6A, but instead is directed to a point in the peripheral field of view along a peripheral line of sight 6B.
Figure 1A:
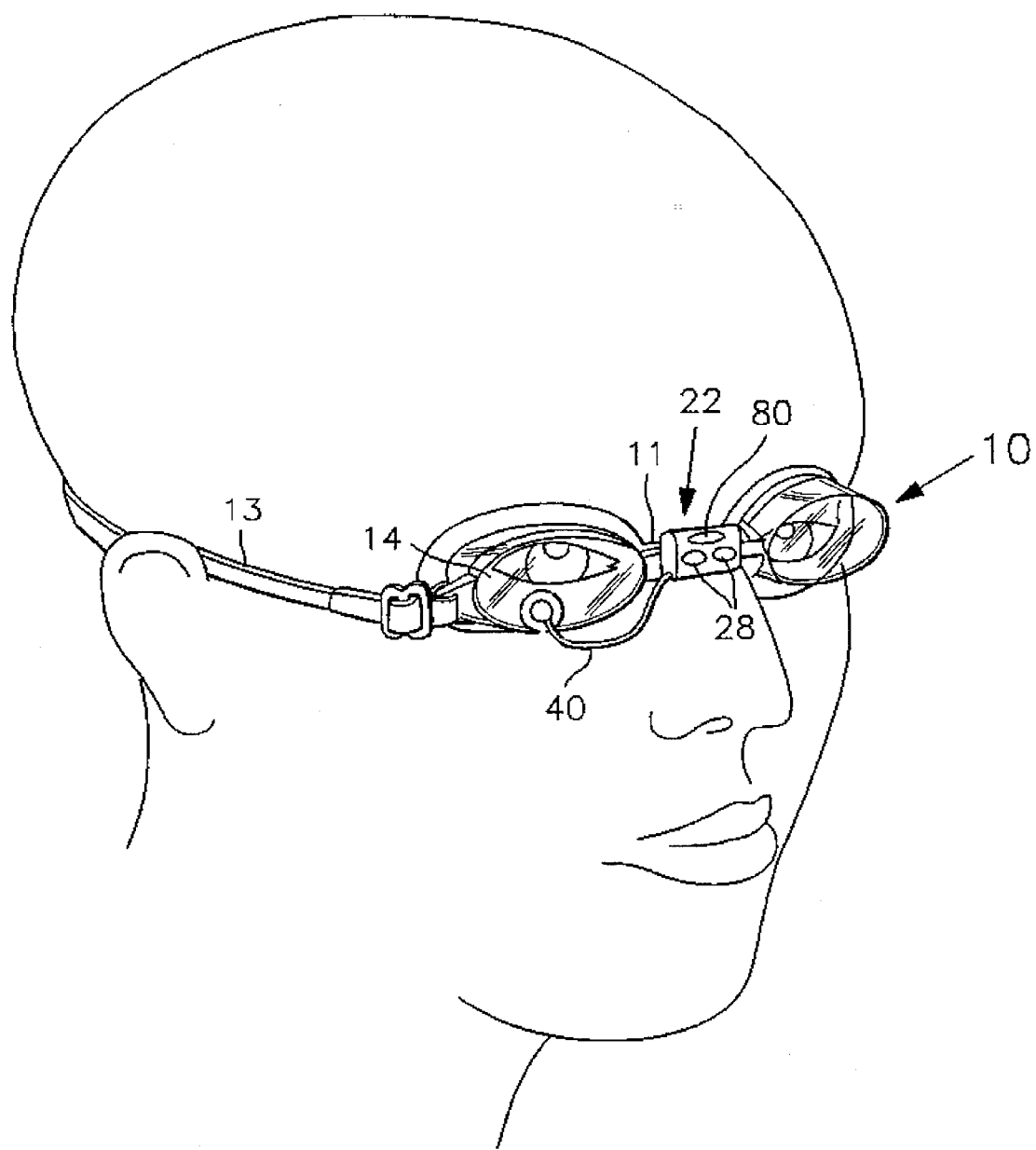
FIG. 1A is a perspective view of the preferred embodiment as shown in FIG. 1 particularly showing the placement of the components of the invention in which a second possible placements of the housing 22 is shown.

The display apparatus includes an information control means 20 that is contained within a housing 22. The housing 22 preferably has a compact, rectangular or cylindrical shape and is of a size, shape and weight appropriate for comfortably attaching to either the bridge 11 or temple 13 contacting portions of a typical eyewear, as illustrated in FIGS. 1 and 1A.

The information control means 20 is an electrical circuit that is powered by a DC power source 29A preferably a battery interconnected with the circuit by an "on-off" switch 29B. The information control means 20 includes of a variety of components designed to gather information related to the wearer's performance. For example, the control means 20 preferably includes a pulse detection means 70 that is contained within the housing 22 so as to be in contact with the wearer's temple or bridge of the nose for monitoring the wearer's heart rate. Such a pulse detection means 70 is well known in the state of the art, so that it is not further detailed here. The control means also preferably includes an activity parameter sensing means 80 for monitoring, in only one possible example, the wearer's position. There are numerous different embodiments of the activity parameter sensing means 80 that can be successfully implemented within the scope of the present invention. In one preferred embodiment, the activity parameter sensing means 80 consists of a motion sensing switch that is responsive to changes in position of the wearer. This embodiment is particularly suited for monitoring swimming laps, as a change in position will be recorded each time the wearer does a flip-turn at the completion of a lap. Such a position sensitive switch may be a simple mercury switch, or any gravity or inertial sensitive device, as are well known in the art, so as to not be further detailed here. In another embodiment, the activity parameter sensing means 80 comprises a electromagnetic proximity switch, responsive to a remote electromagnetic signal, for instance in determining the exact location of the athlete. Such devices are well known in position finders in the art, so as to not require further detailing here. In yet another embodiment, the activity parameter sensing means 80 comprises a capacitance discharge sensor switch that is responsive to changes in the wearer's body position and location. In such switches, well known in the art, a transistor is fired by a field sensitive capacitance device. Such a device could be fired upon changes in body position to move the device from a water environment to an air environment momentarily, or by the simple change in direction which might cause any change in the capacitance seen by the device. In yet another embodiment the activity parameter sensing means might comprise an infrared light beam sensing switch, responsive to a remote light. The display apparatus may include a single activity parameter sensing means 80, or, alternately, it may include several different types of sensing means 80 so as to effectively sense more than one parameter change.

Figure 3:
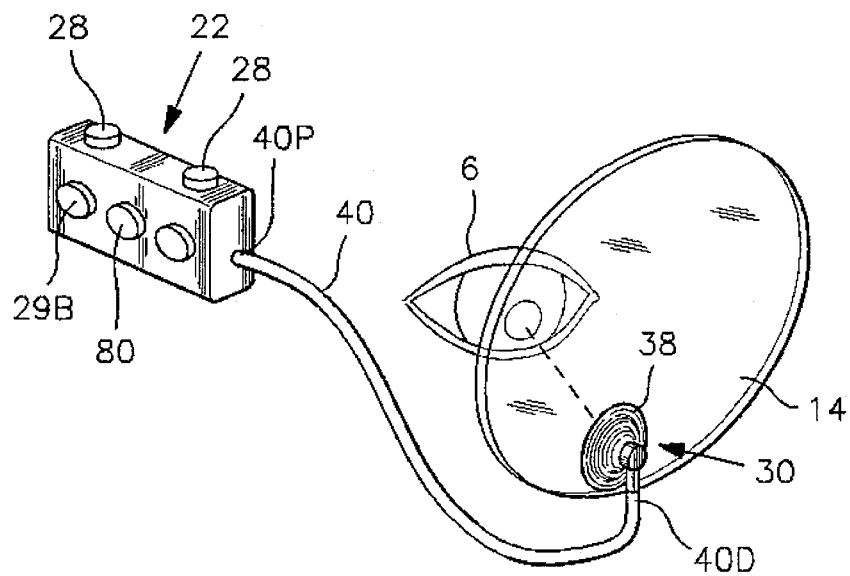
FIG. 3 is a perspective view of the invention, illustrating the preferred placement of components thereof.

In addition to the pulse detecting means 70 and the activity parameter sensing means 80, components that are well known in the art for monitoring blood pressure, speed, distance covered, and other such relevant data may also be included in the information control means 20. It should be noted that the exact combination of features included in a single display apparatus is preferably determined by the intended use of the apparatus. A switching means 28, preferably consisting of one or more push buttons, is positioned in the housing unit 22 so as to allow the wearer to manually select which information is displayed during a given activity (FIG. 3). The switching means 28 would preferably include several push buttons available for programing the control means for displaying the desired parameters. Such push button means is well known in the art.

For many activities, especially those in which time is essential, it is impossible for the wearer to manually activate the display apparatus at the start of the activity. Thus, the apparatus preferably includes an automatic activation means 50 which activates the information control means 20 when activity begins. There are numerous possible embodiments of the automatic activation means 50 that can be successfully implemented within the scope of the present invention, different embodiments designed to correspond with different types of activities. For example, when the display apparatus is intended for use primarily with swimming activities, an impact sensitive switch is implemented, the switch positioned so that a force impact activates the information control means 20. Thus, upon diving into the water, the impact sensitive switch activates the apparatus. In another preferred embodiment, the automatic activation means 50 consists of a light signal sensing switch that activates the information control means 20 when an external light flash is detected. This embodiment is especially designed for use in competitive events, as the external light flashes are preferably emitted from the starter's gun to signal the beginning of the event. Preferably, the display apparatus includes several different types of automatic activation means 50, thus allowing a single apparatus to be used for a variety of different activities.

The information control means 20 also includes a microprocessing means 24 that is in communication with these various components described above, so as to receive all of the collected information and to generate a visual display. This information is communicated to an information display means 26 that creates an image of the information. The display means 26 may be an LCD, LED or CRT display or other optical image forming device. The information control means 20 may be set so to sequence the display means 26 so that time, heartbeat, lap count and other such information is alternately displayed, or it may be set to display only one parameter, updating the parameter value at a selected rate.

A fiber optic element 40 is used to transmit the image from the display means 26, which is positioned within the housing unit 22, to a point where it is clearly visible to the wearer. The fiber optic element 40 may be either rigid or flexible, as is well known in the art. Its proximal end 40P is optically engaged with the display means 26, and its distal end 40D is connected to an information viewing means 30, as best seen in FIG. 3. The information viewing means 30 is attached to the lens 14 of the eyewear 10 in a position determined by the wearer. It may either be positioned to one side of the viewer's field of view so that it is not positioned along the wearer's normal line of sight 6A, but instead is directed to a point in the peripheral field of view along a peripheral line of sight 6B, or it may alternately be positioned directly in the wearer's normal line of sight 6A. It should be noted that when positioned directly in the wearer's line of sight 6A, the fiber optic element 40 is so small and is positioned so close to the wearer's eye that it is out of the wearer's field of focus and therefore not intrusive to the wearer's vision. Preferably, the information viewing means 30 is secured to the lens 14 by means of a suction cup 38. This enables the wearer to easily and quickly reposition the viewing means 30 as needed to project the image to the desired location and to fit the invention to different eyewear.

Figure 4:
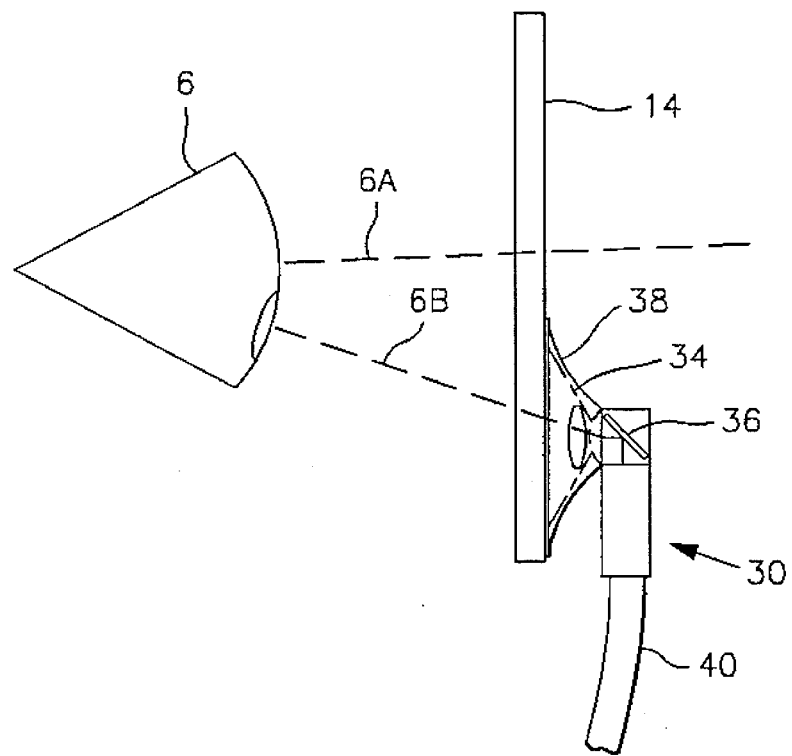
FIG. 4 is a schematic side view of the lens and display device.

The information viewing means 30 includes a mirror 36 constructed and positioned so as to direct the image from the distal end 40D of the fiber optic element 40 toward an optical lens means 34, the lens means enlarging the image and focusing the image at a convenient location in space, as illustrated in FIG. 4. As such, although shown as a single lens element in FIG. 4, the lens means may be a compound lens or other optical device necessary to fulfill the objectives of enlargement and focusing. The optical lens means 34 is positioned between the mirror 36 and the wearer's eye 6 so as to effectively enlarge the image and place its focal point within the focusing range of the wearer's eye 6. This makes the image clearly visible to the wearer without requiring that the wearer's eyes be re-focused continually to monitor the display.

While the invention has been described with reference to a preferred embodiment, it is to be clearly understood by those skilled in the art that the invention is not limited thereto. Rather, the scope of the invention is to be interpreted only in conjunction with the appended claims.

What is claimed is:

1. A multi-function display apparatus secured to a eyewear worn by a person, the eyewear having temple contacting or bridge contacting portions and at least one lens portion, the apparatus comprising:

an information control means mainly enclosed by a housing, the information control means of a size and a shape as to fit, affixed to the bridge contacting portion of the eyewear and supported by the eyewear, the information control means arranged as an electrical circuit containing elements: a microprocessing means capable of generating information related to the person, an information display means presenting an image of the information, at least one switching means selecting the desired image for the information display means, and a power source;

a fiber optic element having a proximal end engaging the display means and conducting the image therefrom;

an information viewing means attached to the at least one lens and positioned in the person's field of view, a distal end of the fiber optic element conducting the image to the information viewing means.

2. The apparatus of claim 1 wherein the information viewing means further includes an optical lens means enlarging the image from the fiber optic element and placing the focal point thereof within the focusing range of the person's eye.

3. The apparatus of claim 2 wherein the distal end of the fiber optic element is not aligned with the person's eye and wherein the information viewing means further comprises a mirror construed and positioned so as to direct the image from the distal end of the fiber optic element through the optical lens to the eye of the person.

4. The apparatus of claim 3 further comprising a suction cup affixing the information viewing means to the at least one lens.

5. The apparatus of claim 3 wherein the electrical circuit further contains an impact sensitive switch positioned such that a force impact thereon causes the impact sensitive switch to activate the information control means.

6. The apparatus of claim 3 wherein the electrical circuit further contains a light signal sensing switch positioned for receiving external light flashes to activate the information control means.

7. The apparatus of claim 3 wherein the electrical circuit further contains an activity parameter sensing means.

8. The apparatus of claim 7 wherein the activity parameter sensing means comprises a motion sensing switch, responsive to changes in position of the person.

9. The apparatus of claim 7 wherein the activity parameter sensing means comprises a electromagnetic proximity switch, responsive to a remote electromagnetic signal.

10. The apparatus of claim 7 wherein the activity parameter sensing means comprises a capacitance discharge sensor switch, responsive to changes in body position and location.

11. The apparatus of claim 7 wherein the activity parameter sensing means comprises an infrared light beam sensing switch, responsive to a remote light source.

12. The apparatus of claim 1 wherein the electrical circuit further contains a pulse detection means in contact with the person providing heart beat information to the information control means.

13. The apparatus of claim 12 wherein the pulse detection means is positioned in contact with the bridge of the person's nose.

14. The apparatus of claim 12 wherein the information control means sequences the display means between time information and heart beat information.

15. A multi-function display apparatus secured to a eyewear worn by a person, the eyewear having temple contacting or bridge contacting portions and at least one lens portion, the apparatus comprising:

an information control means mainly enclosed by a housing, the information control means of a size and a shape as to fit, affixed to the temple contacting portion of the eyewear and supported by the eyewear, the information control means arranged as an electrical circuit containing elements: a microprocessing means capable of generating information related to the person, an information display means presenting an image of the information, at least one switching means selecting the desired image for the information display means, and a power source;

a fiber optic element having a proximal end engaging the display means and conducting the image therefrom;

an information viewing means attached to the at least one lens and positioned in the person's field of view, a distal end of the fiber optic element conducting the image to the information viewing means.

16. The apparatus of claim 15 wherein the electrical circuit further contains a pulse detection means in contact with one of the person's temples providing heart beat information to the information control means.

* * * * *